United States Patent [19]
Iida et al.

[11] Patent Number: 5,841,080
[45] Date of Patent: Nov. 24, 1998

[54] BLOWER PIPE WITH SILENCER

[75] Inventors: Giichi Iida; Kouji Arahata; Tetsuya Yoshioka, all of Tokyo, Japan

[73] Assignee: Kioritz Corporation, Tokyo, Japan

[21] Appl. No.: 844,044

[22] Filed: Apr. 18, 1997

[30]    Foreign Application Priority Data

Apr. 24, 1996 [JP] Japan .................................. 8-102664

[51] Int. Cl.⁶ .............................. F01N 7/00; F04D 29/66
[52] U.S. Cl. .......................... 181/225; 181/230; 415/119
[58] Field of Search .................................... 181/224, 225, 181/230, 200, 202, 204, 205, 211, 252, 256; 415/119

[56]            References Cited

U.S. PATENT DOCUMENTS 4,508,486  4/1985  Tinker ....................................... 415/119
4,692,091  9/1987  Ritenouor ................................ 415/119
4,828,175  5/1989  Heufler et al. .......................... 181/202

OTHER PUBLICATIONS

Japanese Utility Model Publication No. 5–14000, pp. 417–422, Apr. 14, 1993.

*Primary Examiner*—Khanh Dang
*Attorney, Agent, or Firm*—Baker & Botts, L.L.P.

[57]            ABSTRACT

A working machine such as a power blower has a blower pipe with a silencer. The blower pipe has an outer pipe and a perforated inner pipe, with a sound absorbing material disposed between the inner and outer pipes. For ease of handling in use of the power blower, the outer pipe has substantially constant diameter. For ease of storage, the pipe is detachable.

8 Claims, 4 Drawing Sheets

BLOWER PIPE WITH SILENCER

BACKGROUND OF THE INVENTION

1. Field of the Invention

The present invention relates to a power working machine such as a power blower and the like, for performing cleaning work and the like utilizing a high speed air stream blown out by the blower, and more particularly to a blower pipe with silencer connected to an air stream delivery spout of the power working machine.

2. Description of the Related Art

A power working machine of this type, such as a power blower, is provided with an internal-combustion engine such as a compact air-cooled two-stroke gasoline engine which rotates a blower fan. A blower pipe is connected to the main body of the machine, a compressed, high speed air stream from the blower fan is blown out from the tip of the blower pipe, and cleaning work such as collecting fallen leaves, dust, and the like is performed utilizing the high speed air stream from the blower pipe.

FIG. 4 shows a blower pipe end of a conventional power blower. Shown are a fan casing 52 in which a blower fan 51 is rotated by an internal-combustion engine (not shown), a machine body 50, and a flexible compressed air guide pipe 53 connected to the fan casing 52 for guiding an air stream to the outside of the machine body 50. A blower pipe 54 is connected to the compressed air guide pipe 53, and a compressed air outlet 55 is provided at a free end of the blower pipe 54. The blower pipe 54 has an enlarged outer diameter for installing a sound absorption material 56 therein. The sound absorption material 56 absorbs sound generated by the air stream in the blower pipe 54, thus reducing the noise caused by the air stream blown out from the blower pipe 54.

BRIEF SUMMARY OF THE INVENTION

For a power blower with an internal combustion engine such as a compact air-cooled two-stroke gasoline engine rotating a blower fan, when intending to reduce noise from the blower fan and the blower pipe, further considerations such as compactness, portability and ease of handling and use are important. With the construction according to FIG. 4, though noise is reduced, the blower pipe is difficult to grip where its outer diameter is increased for the sake of inclusion of the absorption material. Also, for ease of use, the blower pipe should have a certain length, but for ease of transportation and storage it should be easily detachable or separable. These considerations are addressed by the present invention.

Preferably, a blower pipe according to the present invention has outer and inner pipes, with an outer diameter of an outer pipe being substantially constant over its length, an inner pipe having silencer holes, and a sound absorbing material, e.g. urethane foam or the like being disposed between the pipes.

In a blower pipe with silencer according to a preferred embodiment of the present invention, the outer pipe is provided with an inlet side connecting portion and an outlet side connecting portion, and a pair of L-shaped connecting channels or projection pins on the inlet side connecting portion and the outlet side connecting portion.

Further, a blower pipe with silencer according to another preferred embodiment of the present invention is characterized in that the inner pipe comprises a portion which widens toward an inlet thereof, and has silencer holes in a straight portion thereof.

In the blower pipe with silencer according to the present invention with the above-mentioned construction, the inlet side connecting portion is connected and fixed to an air outlet spout of a power working machine such as a power blower, and the outlet side connecting portion is connected and fixed to a blower pipe with a blow off spout. In operation, the power blower produces compressed air, and the air stream is blown out from the blow off spout to perform cleaning work such as collecting fallen leaves and the like.

A preferred blower pipe with silencer according to the present invention is provided with an outer pipe, an inner pipe, and silencing material disposed between the two pipes. The inlet side of the inner pipe is formed as a portion which widens toward the inlet, so that an air stream from the air outlet spout is introduced into the inner pipe with less flow resistance. A portion of the air stream is guided into the silencing material between the outer pipe and the inner pipe through the silencer holes in the straight portion of the inner pipe so that, even if a thin silencing material is used, desired silencing is realized on account of its length, without affecting operability.

Further, the blower pipe with silencer can easily be connected and fixed to an air outlet spout by a single action, as the inlet side connecting portion and the outlet side connecting portion of the outer pipe are provided with a pair of L-shaped connecting channels or projection pins.

BRIEF DESCRIPTION OF THE SEVERAL VIEWS OF THE DRAWINGS

The present invention will be more apparent from the following description with reference to the accompanying drawings wherein.

DETAILED DESCRIPTION OF PREFERRED EMBODIMENTS

An embodiment of the present invention is described below with reference to the drawings.

Figure 1:
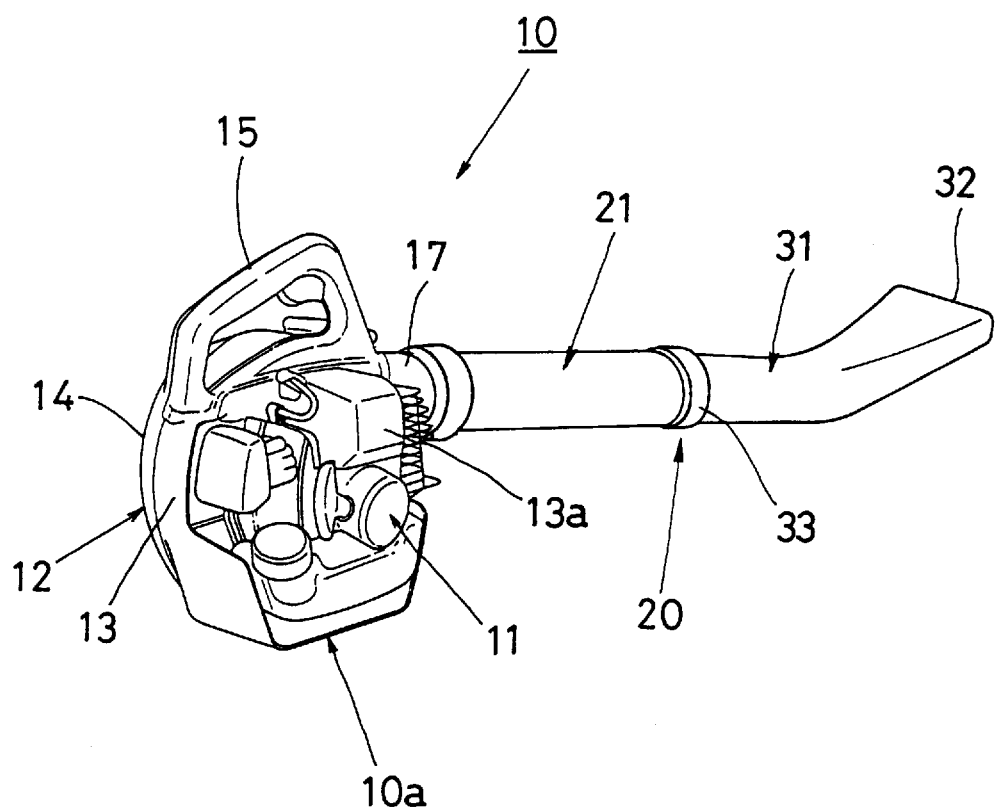
FIG. 1 is a schematic perspective view of a power blower provided with a blower pipe with silencer according to one embodiment of the present invention.

FIG. 1 is a general perspective view of a power blower 10 as a power working machine to which a blower pipe according to this embodiment is mounted. The power blower 10 comprises a main body 10a and a blower pipe 20. On one side of the main body 10a there is situated an internal-combustion engine 11 such as a compact air-cooled two-stroke gasoline engine, and on the other side of the main body 10a opposite to the internal-combustion engine 11 there is located a blower fan (not shown). The blower fan is coupled to the internal-combustion engine 11 so as to be driven by the engine 11.

The main body 10a is formed with a cover 12 which consists of left and right cover portions 13, 14. The right cover portion 13 is integrally formed with a cylinder cover 13a, at a side portion thereof, for covering the cylinder of the internal-combustion engine 11. The cover portions 13, 14 form respective half portions of a hollow grip 15 integrally at their upper junction portion, and the half portions are combined with each other to form the hollow grip 15.

The left cover portion 14 is formed so as to cover the blower fan, and an air intake opening (not shown) for taking in air from the outside to the blower fan is formed at the center of the cover portion 14. Further, an air outlet spout 17 formed by joining the left and right cover portions 13, 14 is disposed at the main body 10a. With this construction, air taken from the air intake opening of the left cover portion 14 is compressed and transported to the air outlet spout 17.

The blower pipe 20 is detachably connected to the air outlet spout 17 of the main body 10a, and comprises a blower pipe portion 21 with silencer, and a blower pipe portion 31 with a blow off spout 32.

The blower pipe portion 21 with silencer and the blower pipe portion 31 with a blow off spout are formed so as to be detachable from and attachable to each other. When the blower pipe 20 is used, one end of the blower pipe portion 21 with silencer is connected and fixed to the air outlet spout 17, and one end of the blower pipe portion 31 with a blow off spout is connected and fixed to the other end of the blower pipe portion 21 with silencer. The air stream compressed and transported by the blower fan to the outlet spout 17 passes through the blower pipe 20, and is blown off from the flat blow off spout 32 which is formed at the far end of the blower pipe portion 31 to perform cleaning work for collecting fallen leaves and the like.

Figure 2:
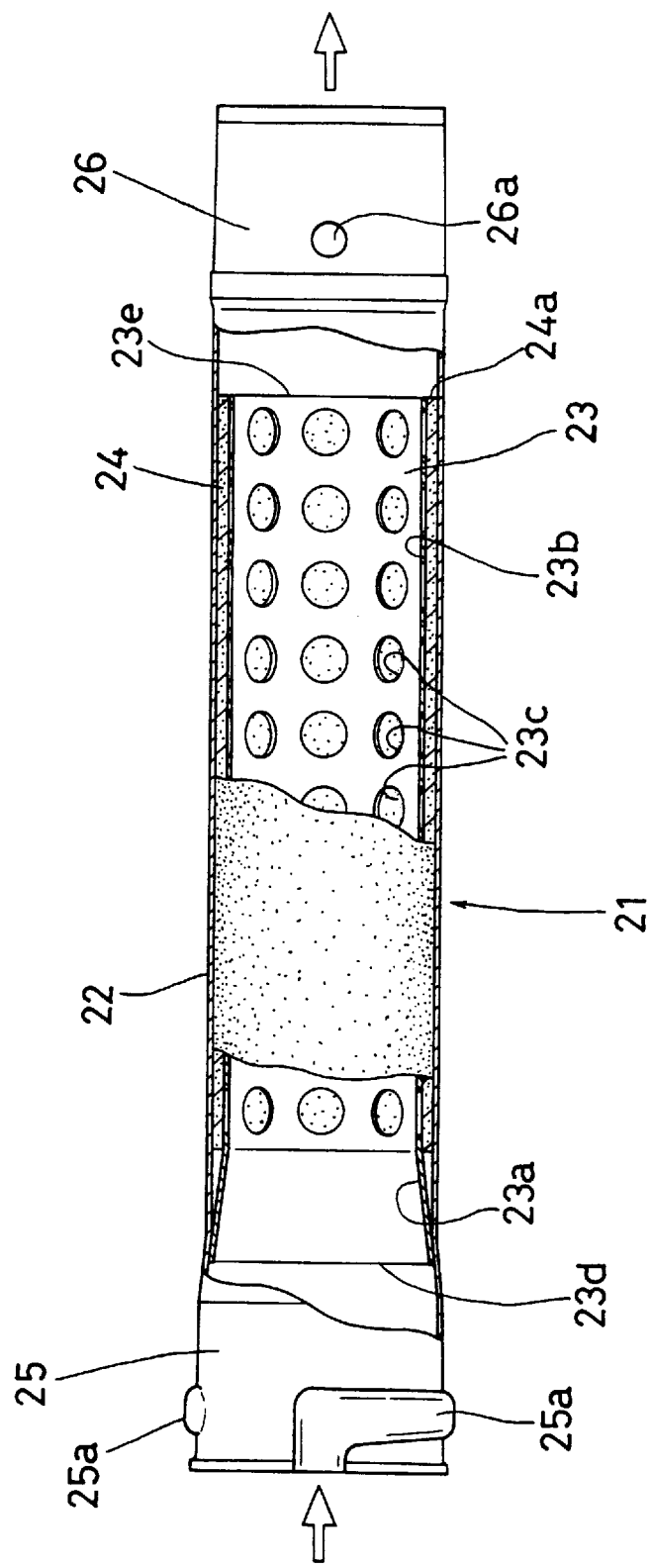
FIG. 2 is a partly fragmented side view of the blower pipe with silencer shown in FIG. 1.

FIG. 2 shows the blower pipe portion 21 with silencer in detail. The blower pipe portion 21 has an outer pipe 22 and an inner pipe 23 disposed in the outer pipe 22. Urethane foam 24 is disposed between the inner pipe 23 and the outer pipe 22 as the sound absorption material which is thin so as to offer less flow resistance, and which is as long as possible to provide high silencing capacity.

The outer diameter of the outer pipe 22 has suitable dimension for an operator to grip it. Preferably, the outer diameter of the overall pipe is essentially constant, or it may be slightly tapered toward the free end for improved appearance and the like.

Figure 3:
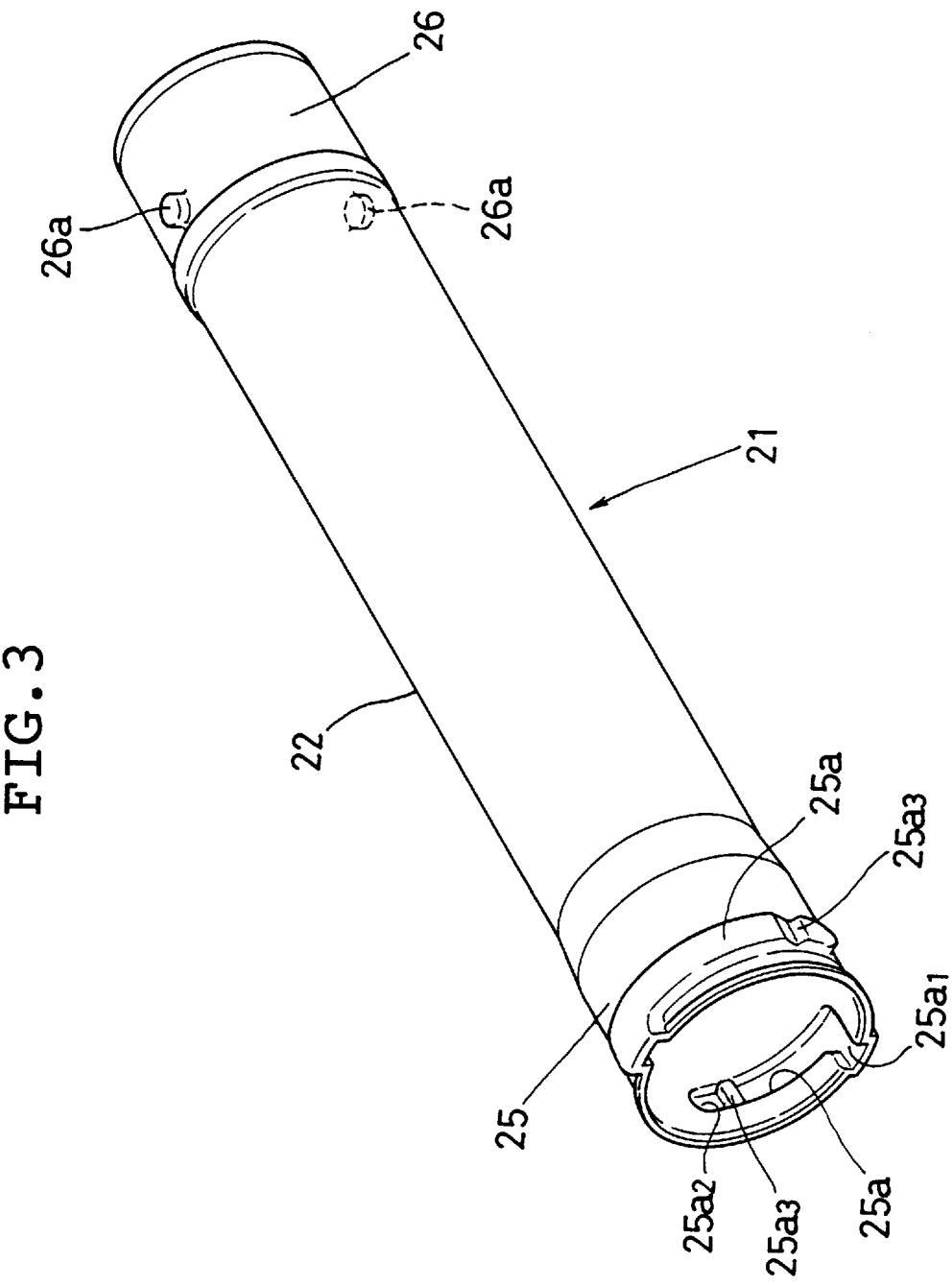
FIG. 3 is a schematic perspective view of the blower pipe with silencer shown in FIG. 1.
Figure 4:
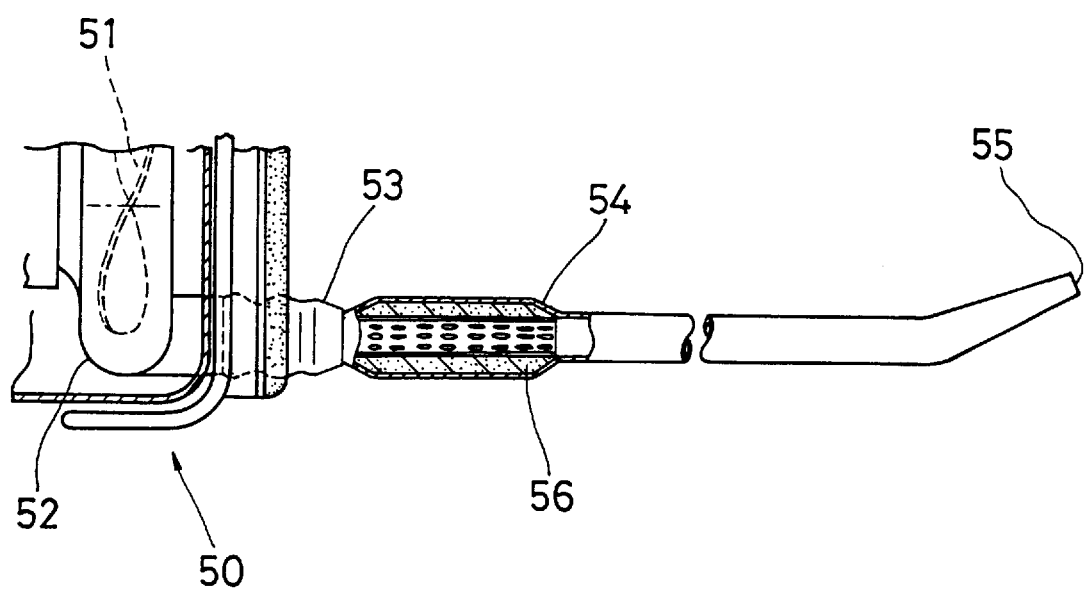
FIG. 4 is a party fragmented view of a power blower provided with a conventional blower pipe with silencer.

The left side of the outer pipe 22 in FIG. 2 forms the inlet side connecting portion 25 for the air outlet spout 17 of the main body 10a of the power blower 10, and the right side of the outer pipe 22 forms the outlet side connecting portion 26 for the blower pipe portion 31 with a blow off spout. The inlet side connecting portion 25 has two L-shaped connecting channels 25a, 25a formed from the inside of the outer pipe 22 and opposite to each other, as illustrated in FIG. 3. The connecting channels 25a, 25a comprise a longitudinal portion $25a_1$ formed in the longitudinal direction of the outer pipe 22 and extending to an upstream side end portion of the connecting portion 25, and a circumference portion $25a_2$ extending circumferentially perpendicular to the longitudinal portion $25a_1$. Further, on a lower outlet side connecting portion 26, two projection pins 26a, 26b are formed opposite to each other on the outer circumference of the pipe 21.

The diameter of the inlet side connecting portion 25 is formed slightly larger than that of an intermediate portion of the outer pipe 22, and the air outlet spout 17 of the main body 10a is connected to the inlet side connecting portion 25 so as to be connected and fixed thereto. The outer periphery of the air outlet spout 17 is formed into the same shape as the outlet side connecting portion 26 of the outer pipe 22. Thus, two projection pins (not shown) are provided opposite to each other on the outer periphery of the air outlet spout 17, and the two projection pins are axially inserted into the longitudinal portions $25a_1$, $25a_1$ of the connecting channels 25a, 25a of the inlet side connecting portion 25, and are connected and fixed to the circumference portions $25a_2$, $25a_2$ of the connecting channels 25a, 25b by rotation of the outer pipe 22. The circumference portions $25a_2$, $25a_2$ are formed such that the width of the channel gradually decreases, and the two projection pins are tightly held in the circumference portions $25a_2$, $25a_2$ at a position where the two projection pins ridden over a stopper ridge $25a_3$ and where the channel has the same width as the pins.

One end portion 33 of the blower pipe portion 31 with a blow off spout is connected and fixed to the outlet side connecting portion 26 of the outer pipe 22. This end portion 33 has the same shape as the inlet side connecting portion 25 of the outer pipe 22. That is, though not shown, this end portion 33 has two substantially L-shaped connecting channels formed from the inside of the pipe and opposite to each other, and the connecting channels comprise a longitudinal portion and a circumference portion extending circumferentially perpendicular to the longitudinal direction, for connecting and fixing to the outlet side connecting portion 26 of the outer pipe 22 by connecting the two substantially L-shaped connecting channels with the two projection pins 26a, 26a of the outlet side connecting portion 26 of the outer pipe 22.

An inlet side of the inner pipe 23 extends to the vicinity of the inlet side connecting portion 25, and its end portion 23a is tapered such that compressed air from the air outlet spout 17 of the main body 10a is guided into the inner pipe 23 of the blower pipe 21 with less flow resistance. A number of silencer holes 23c, 23c, . . . are at the circumference of the straight main body cylinder portion 23b extending from the tapered end portion 23a, and a compressed air stream is guided to the urethane foam 24 between the outer pipe 22 and the inner pipe 23 through the silencer holes 23c, 23c, . . . , and is absorbed therein to provide a silencing effect.

Further, an upstream end portion 23d of the tapered portion 23a is fixed to the inner periphery of the outer pipe 22 with suitable means such as an adhesive. As the downstream end portion 23e is free, vibration of the inner pipe 23 is effectively absorbed by the urethane foam 24 which inhibits the transmission of vibration to the outer pipe 22. Further, a downstream end portion 24a of the urethane foam 24 is open, for reduced flow resistance for the air stream.

The blower pipe 21 with silencer as described above considerably reduces noise in a high frequency band. Noise is reduced on average by approximately 1 dB (A) in a lateral direction, and by approximately 3 to 4 dB (A) in the forward direction, as compared with a conventional blower pipe without a silencer.

With the blower pipe 21 with silencer according to this embodiment, desirable noise reduction is obtained when the diameter of the silencer holes 23c of the inner pipe 22 is about 10 mm, for the pipe 21 with a diameter of 60 mm.

The present invention is not restricted to the above-described embodiment, and many variations may be made in design without deviating from the principle of the present invention claimed.

For example, in the above embodiment, one blower pipe with silencer is connected to the air outlet spout of the main body. Alternatively, depending on intended use, the blower pipe with silencer can be constructed so that a plurality of blower pipes are connected in sequence to improve operability thereof and to reduce noise. Further, the shape and arrangement of the silencer holes, the properties of the silencing material, and the like may be changed to suite the occasion.

As described, the blower pipe with silencer according to the present invention comprises an outer pipe, an inner pipe, and sound absorption material disposed between the outer pipe and the inner pipe, so that the outer diameter and the shape of the blower pipe need not to be large as independently providing a silencer, and so that an operator can easily grip the blower pipe.

Further, the inlet side of the inner pipe widens toward the inlet thereof, so that an air stream from the air outlet spout is introduced into the inner pipe with less flow resistance. The straight cylindrical portion extending from the widening portion is provided with silencer holes, and an air stream is guided into the silencing material disposed between the outer pipe and the inner pipe through the silencer holes, so that the air stream is effectively absorbed by the silencing material. As compared with a conventional silencer, ease of handling is not impaired.

Still further, the blower pipe with silencer can be connected and fixed through a single action to the air outlet spout of a power working machine such as a power blower, as the inlet side connecting portion and the outlet side connecting portion of the outer pipe both are provided with L-shaped connecting channels or projection pins.

What is claimed is:

1. A blower pipe, including a silencer, for use with a power blower having an air outlet spout, said blower pipe comprising:

an outer pipe having an upstream portion adapted to be secured to the air outlet spout;

an inner pipe disposed substantially coaxially within said outer pipe, said inner pipe having an upstream end portion which widens outwardly towards said upstream portion of said outer pipe to lower flow resistance to air from the air outlet spout, said inner pipe having a main portion located downstream of said upstream end portion, said main portion having a substantially constant diameter and a plurality of lateral holes formed therein, said main portion terminating in a free downstream end portion, said outer pipe, said inner pipe upstream end portion and said inner pipe main portion defining a sound-absorption-material-receiving space therebetween; and a sound absorption material disposed in said space, said material having an open downstream end for reduced flow resistance to the air, said open downstream end being substantially contiguous with said free downstream end portion of said main portion of said inner pipe for inhibiting transmission of vibration of said inner pipe to said outer pipe.

2. The blower pipe according to claim 1, wherein said outer pipe has a substantially constant outer diameter.

3. The blower pipe according to claim 1, wherein the outer pipe has pipe inlet and outlet side connecting portions.

4. A blower pipe including a silencer for interconnection with a mating section having pins, said blower pipe comprising:

an outer pipe;

an inner pipe disposed substantially coaxially within the outer pipe and having a plurality of lateral holes; and a sound absorption material disposed in a space between the inner pipe and the outer pipe;

wherein;

the outer pipe has pipe has pipe inlet and outlet side connecting portions; and at least one of the pipe inlet and outlet side connecting portions comprises a pair of L-shaped connecting grooves for holding the pins.

5. The blower pipe according to claim 4, wherein at least one of the pipe inlet and outlet connecting portions comprises a pair of connecting pins for holding in said L-shaped connecting grooves.

6. The blower pipe according to claim 1, wherein the sound absorption material comprises urethane foam.

7. The blower pipe of claim 1, wherein said outer pipe is dimensioned to be grippable by a user of the power blower.

8. The blower pipe of claim 1, wherein said blower pipe has a diameter of about 60 millimeters and wherein said plurality of lateral holes each have a diameter of about 10 millimeters.

* * * * *